Aug. 5, 1952     E. C. MANDERFELD     2,605,673
FRAMING LIGHT AND CONTROL FOR MOTION-PICTURE MACHINES
Filed Feb. 17, 1950     5 Sheets-Sheet 1

Fig. 1.

INVENTOR.
EMANUEL C. MANDERFELD,
BY
ATTORNEYS.

Aug. 5, 1952  E. C. MANDERFELD  2,605,673
FRAMING LIGHT AND CONTROL FOR MOTION-PICTURE MACHINES
Filed Feb. 17, 1950  5 Sheets-Sheet 2

EMANUEL C. MANDERFELD,
INVENTOR.

BY
ATTORNEYS.

Aug. 5, 1952     E. C. MANDERFELD     2,605,673
FRAMING LIGHT AND CONTROL FOR MOTION-PICTURE MACHINES
Filed Feb. 17, 1950     5 Sheets-Sheet 3

EMANUEL C. MANDERFELD,
INVENTOR.

BY
ATTORNEYS.

Aug. 5, 1952 E. C. MANDERFELD 2,605,673
FRAMING LIGHT AND CONTROL FOR MOTION-PICTURE MACHINES
Filed Feb. 17, 1950 5 Sheets-Sheet 4

EMANUEL C. MANDERFELD,
INVENTOR.

BY
ATTORNEYS.

Aug. 5, 1952 E. C. MANDERFELD 2,605,673
FRAMING LIGHT AND CONTROL FOR MOTION-PICTURE MACHINES
Filed Feb. 17, 1950 5 Sheets-Sheet 5

INVENTOR.
Emanuel C. Manderfeld,
BY
Barkelew & Scantlebury
Attorneys.

Patented Aug. 5, 1952

2,605,673

UNITED STATES PATENT OFFICE 2,605,673

FRAMING LIGHT AND CONTROL FOR MOTION-PICTURE MACHINES

Emanuel C. Manderfeld, Los Angeles, Calif., assignor to Mitchell Camera Corporation, Glendale, Calif., a corporation of Delaware Application February 17, 1950, Serial No. 144,621

7 Claims. (Cl. 88—18)

This invention is concerned generally with the problem of threading film into the film feeding mechanism of a machine such, for example, as a motion picture projector. Standard 35 mm. motion picture film has four sets of sprocket holes per picture frame, and it is necessary in threading a projector that the individual sprocket teeth (or other film engaging means) of the film feeding mechanism engage the correct holes in the film, so that the picture frames of the film will register properly with the aperture in the film gate.

The film advancing mechanism includes an intermittent mechanism the cycle of operation of which includes a film advancing phase and a film arresting phase. When the machine is standing stationary with its intermittent mechanism in a position within the film advancing phase of its cycle, the picture frames of the film are ordinarily not registered with the film aperture, since the film is then part way between one frame registering position and the next. The exact relation between the picture aperture and the film frames then depends upon the exact phase position of the intermittent mechanism within the film moving portion of its cycle, so that it is difficult to position the film correctly. However, during the whole of the film arresting phase of the cycle a film frame is registered with the aperture. The film can then be correctly placed without regard to the precise phase position of the intermittent mechanism within the film arresting portion of its cycle. Hence in threading a projection machine the framing adjustment is preferably (and, in practice, necessarily) performed with the intermittent mechanism at some (largely arbitrary) position within its film arresting phase.

For this reason, before engaging the film with the film moving mechanism, the operator first turns the mechanism to a film arresting portion of its cycle. He then slides the film longitudinally until a frame is registered with the film aperture, and finally effectively locks the film in that position. Such locking of the film may be by direct engagement with the film moving mechanism, as with a movement of Geneva type; or by other means, such as the application of friction by closing the gate, as is typically the case with movements of the claw type. This entire operation, referred to generally as "framing," is a necessary and important part of the film threading process.

An important object of the present invention is the simplification of framing by facilitating the rapid and reliable setting of the film moving mechanism to a film arresting position. A further object is to insure that this setting of the machine is properly carried out before the operator can complete the framing process.

An additional object of the invention is to provide satisfactory illumination of the film aperture to assist the operator in adjusting the film. This is accomplished with a minimum of special apparatus, and without requiring the operator to perform any special operations, such as turning on a light or moving it from one position to another. Since the threading operation must sometimes be performed as rapidly as possible, the resulting simplification and reliability of the process which result from the invention are a very considerable advantage to the operator.

Previously, in preparing to establish or to check the framing of a film, the operator has ordinarily set the film moving mechanism to a film arresting position by turning the machine over manually with one hand while either watching the motion of the intermittent sprocket (or other film moving member) or feeling its motion with the other hand. The mechanism is turned until it is in a position where the drive shaft can be turned through a small angle in either direction without causing the sprocket or other member to move. Even if the machine happens to have stopped in a proper framing position, it is generally necessary to check its position in the manner just described before proceeding to frame the film.

According to the present invention the framing process is greatly simplified by providing an indicating signal of suitable type, which is connected to the film moving mechanism in such a way that the signal is actuated automatically when the mechanism is at a phase position safely within the range of its film arresting phase. The signal actuating mechanism is preferably of such a type that the signal operates when the machine is stationary (or is running slowly) but does not operate when the machine is running at its normal operating speed. Typical means by which this condition is satisfied are described in detail below.

Many forms of signal can be used satisfactorily, such for example as an audible bell, operated electrically or mechanically. A preferred form of signal is an electric lamp which is automatically lighted, or its light projection automatically controlled, to indicate correct framing position of the mechanism. Important additional advantages are then obtained, according to the invention, by using the signal lamp to illuminate the film aperture. Use of the signal lamp also as a framing lamp provides the necessary illumination for adjusting the film without requiring additional equipment and without requiring the operator to perform any special operation. At the same time it has the great advantage of insuring that the mechanism is properly set before the film is adjusted. Although the operator might occasionally overlook the absence of an auxiliary signal and adjust the film incorrectly because the mechanism was not in a proper framing position, this can scarcely happen when the only adequate light for adjusting the film is obtained by setting the mechanism correctly.

A clear understanding of the invention, and of further objects and advantages thereof, will be had from the following description of a particular illustrative manner of carrying it into effect, together with certain modifications. That description and the accompanying drawings are intended primarily for purposes of illustration, and are not intended as a limitation upon the scope of the invention. The description is based primarily on embodiments of the invention in a projector having an intermittent movement of the Geneva type and utilizing a rotating sprocket as the direct film moving member. However, such embodiment is only illustrative of the invention, which may be applied to other types of intermittent movements (e. g. the claw type) as will be explained. The following description is to be read in conjunction with the accompanying drawings, of which:

Figure 1:
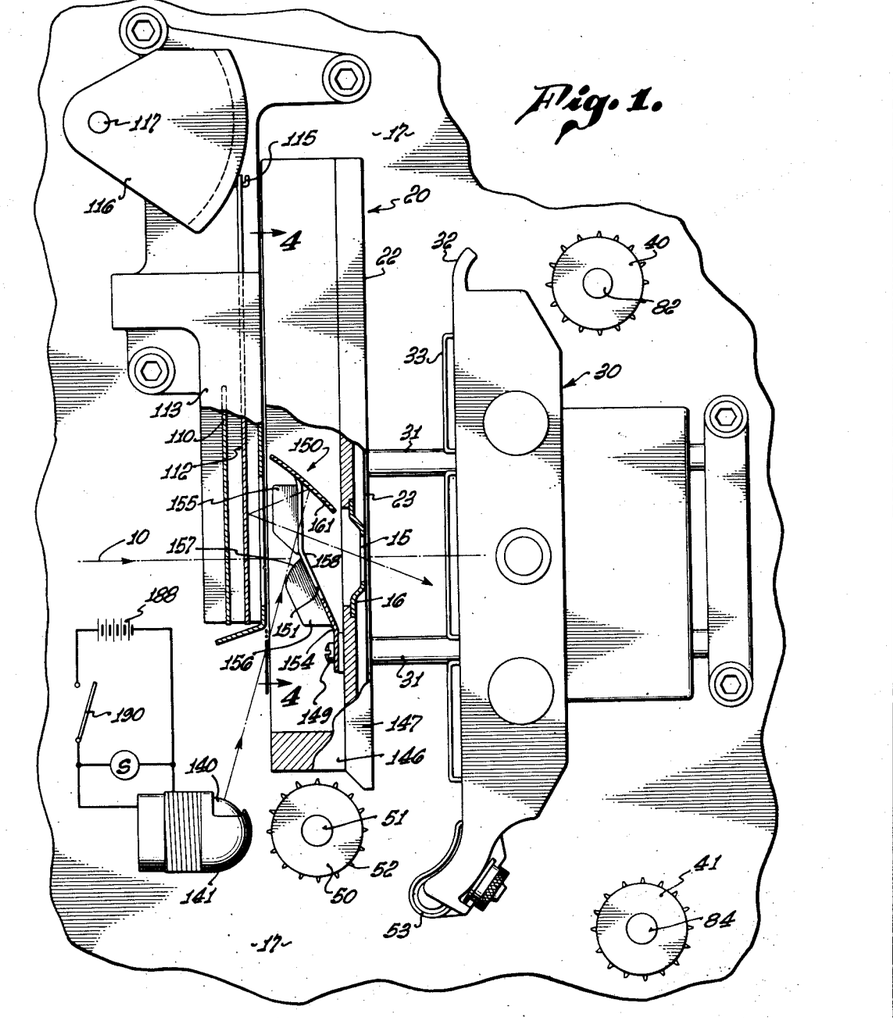
Fig. 1 is a schematic elevation, partially cut away in vertical section through the optical axis, showing a typical film aperture and associated mechanism in accordance with the invention.

In Fig. 1 the optical axis of the projection system is indicated at 10, the light passing from left to right as indicated by the arrow. The film aperture 15 is formed in a removable aperture plate 16 which fits in a lateral slot in the face plate 147 of film trap 20, rigidly mounted on a vertical wall 17 of the main frame of the machine by means not shown. Film gate 30 is movably mounted, as on rails shown schematically at 31, for motion generally parallel to optical axis 10 between an open position, shown in Fig. 1, and a closed position in which the rear face 32 of the gate is adjacent the front face 22 of trap 20. When the gate is in closed position, pressure shoes 33, resiliently mounted on the rear face 32 of the gate, cooperate with vertical film channel 23 in the trap, thereby forming a film chute in which the film is frictionally guided past aperture 15. The film is fed between trap 20 and gate 30 from a continuously movable "pull down" sprocket, shown schematically at 40, and is pulled past aperture 15 by intermittent sprocket 50, which is mounted on sprocket shaft 51 and is driven by an intermittent mechanism 60 of the Geneva type, shown schematically in Fig. 3, which rotates the sprocket intermittently through an angle of 90 degrees, intervals of such movement alternating with intervals of rest. Each interval of sprocket movement moves the film a distance equal to the frame spacing. The film is taken from sprocket 50 by a continuously movable "hold-back" sprocket, shown schematically at 41. A sprocket clamp is shown schematically at 53, mounted on the lower end of gate 30 in such a position that it automatically clamps the film to the intermittent sprocket when the gate is closed, and releases the film when the gate is open. Sprocket clamps for sprockets 40 and 41 are not shown.

Figures 2, 3, 7:
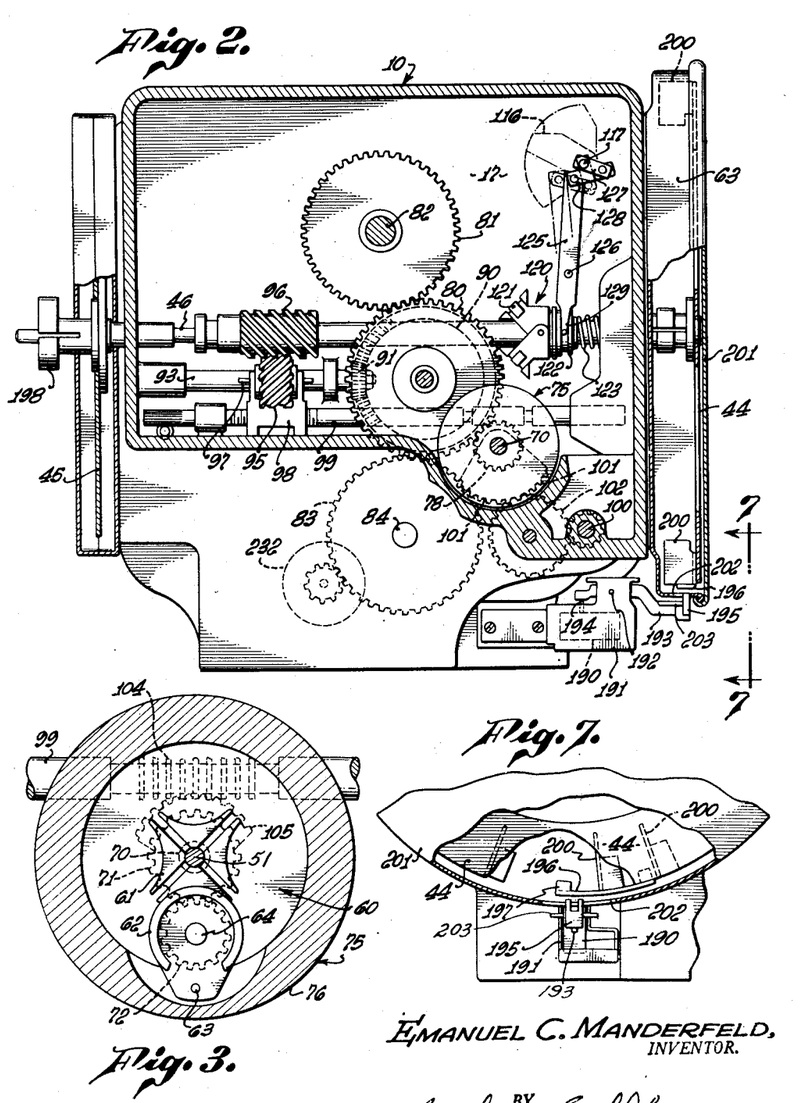
Fig. 2 is a vertical section at reduced scale taken in aspect opposite to that of Fig. 1.
Fig. 3 is a schematic fragmentary section taken on a plane back of the plane of Fig. 2 in opposite aspect (the same aspect as that of Fig. 1) and at enlarged scale.
Fig. 7 is a fragmentary elevation, in aspect indicated by line 7—7 in Fig. 2, and partly broken away.

At any convenient point along optical axis 10 one or more shutters are provided, such as the rotating shutters 44 and 45 mounted on shutter shaft 46 (see Fig. 2). Shutters 44 and 45 are operated in such timed relation to the intermittent mechanism, that during the intervals of film movement past aperture 15 the projection light is cut off, but that the light is transmitted during intervals of film rest.

As the film is initially threaded through film channel 23 and over intermittent sprocket 50, gate 30 being open, the sprocket teeth 52 should engage sprocket holes of the film in proper phase relation with respect to the film picture frames so that a film frame will register (at least approximately) with aperture 15 when the sprocket is in a rest position. Such film adjustment is ordinarily accomplished by first setting intermittent sprocket 50 in a rest position (as by turning over the machine manually) and then sliding the film longitudinally in channel 23 until a film frame is observed to be registered with aperture 15. The film is then pressed over sprocket teeth 52 and held in that engaged position until gate 30 is closed, clamping the film to the sprocket by sprocket clamp 53.

It will be convenient now to describe typical driving and control means by which the intermittent mechanism 60 and shutter shaft 46 are operated in correct mutual phase relation, and with correct overall speed relation to continuously movable sprockets 40 and 41, while permitting adjustment when necessary of the condition of framing during operation of the machine. Reference is made to Patent 2,513,195, issued on June 27, 1950, to George A. Mitchell and Emanuel C. Manderfeld, in which such driving and control means are more fully described and are claimed.

Intermittent sprocket 50 on shaft 51 is rotated through a 90 degree angle in each successive intermittent movement by intermittent mechanism 60, comprising (Fig. 3) a four-sided star cam 61, rigidly mounted directly on sprocket shaft 51 and engaged by pin cam 62, which carries pin 63 and is rigidly mounted on pin cam shaft 64, parallel to sprocket shaft 51. Pin cam shaft 64 is driven from intermittent driving shaft 70, coaxial with sprocket shaft 51, by the pair of gears 71 and 72. The three shafts 51, 64 and 70 are journaled in intermittent housing 75, which in turn is adjustably rotatable about the common axis of shafts 51 and 70. For example, housing 75 may be journaled in wall 17 of the main frame of the machine by means of cylindrical surface 76 which forms the periphery of the housing and is coaxial with shafts 51 and 70.

Intermittent driving shaft 70 carries a gear 78 (Fig. 2) by which the intermittent mechanism 60 is driven from idler gear 80. Gear 80 also directly engages sprocket driving gears 81 and 83, rigidly mounted on shafts 82 and 84, which carry respectively the two sprockets 40 and 41 (Fig. 1). A bevel gear 90, which is preferably integral with idler gear 80, drives shutter shaft 46 through the train comprising bevel pinion 91, jack shaft 93, on which the pinion is fixed, and the pair of meshed helical gears 95 and 96 mounted respectively on the jack shaft and the shutter shaft. Assuming for purposes of illustration that the shutters are designed to make one revolution for each cycle of film movement, and that sprockets 40, 41 and 50 are of equal circumference, the gear ratios are such that shutter shaft 46 and pin cam shaft 64 turn four times as fast as sprocket shafts 82 and 84. A driving motor for the projector is indicated schematically at 232, geared to sprocket gear 83.

If the framing adjustment requires correction during operation of the machine (for example, because of faulty initial framing or as a result of a film imperfection due, e. g. to faulty splicing), this is accomplished by rotation of the entire intermittent housing 75 about the common axis of sprocket shaft 51 and driving shaft 70, for example by manually turning shaft 100, which is linked to sector gear 101 on housing 75 by idler gear 102. Such rotation of housing 75 changes the longitudinal position in film channel 23 at which the film is arrested between intermittent movements, and hence changes the framing adjustment. Rotation of intermittent housing 75 with respect to the main frame of the machine also carries pin cam shaft 64 around intermittent driving shaft 70 (to which it is linked by gears 71, 72) and thus changes the phase relation between the intermittent mechanism and the driving gear train, including gears 78 and 80 and shutter jack shaft 93. If that change of phase between the intermittent mechanism and the driving gear train were permitted to extend to the shutter shaft, it would destroy the shutter timing.

Shutter timing compensation is preferably provided as indicated at Fig. 2, and as described more fully in the above identified copending patent application. Helical gears 95, 96 are so mounted as to be rotationally fixed on their respective shafts but relatively movable in an axial direction, that relative movement being under control of the rotational motion of intermittent housing 75. As shown, gear 96 is rigidly mounted on shutter shaft 46, and gear 95 is rotationally fixed but axially movable on jack shaft 93, to which it is splined at 97. The axial position of gear 95 is controlled by yoke 98, which is axially threaded to rod 99. That rod is rotationally and slidably journaled, its sliding motion being determined by mesh of its cylindrical rack teeth 104 (Fig. 3) with gear sector 105 on intermittent housing 75. As housing 75 is rotated to adjust the framing, helical gear 95 is moved axially a corresponding distance. The resulting relative axial movement of the pair of helical gears 95, 96 produces relative rotational motion through a definite angle, changing the phase relation between shutter shaft 46 and the intermittent driving gear 78. By appropriate proportioning of the parts the just described phase shift between shutter shaft and gear 78 can be made to just compensate for the phase shift described above between gear 78 and the intermittent mechanism, thus maintaining the required constant over-all phase relation or timing between the shutter shaft and the intermittent mechanism, independently of rotational adjustment of intermittent housing 75 for framing. However, with the arrangement here shown, such framing adjustment does alter the phase relation between the intermittent mechanism and parts of the gear train other than shutter shaft 46, including, for example, idler gear 80 and sprockets 40 and 41.

Returning now to the operation of obtaining correct framing of the film when threading a film into the machine, the present invention provides, among other things, an improved arrangement for illuminating the film at the film aperture, by which its condition of framing can be judged. The regular projection light beam cannot be used as a threading light, since the operation of threading necessarily takes place while the machine is not operating. The projection light is then ordinarily turned off and, in any cast, the projection light is then purposely cut off from the film aperture by one or more shutters.

When the film in one machine is nearly exhausted, a light cut-off shutter, commonly referred to as a dowser shutter, indicated schematically at 110 in Fig. 1, is interposed across optical axis 10 (by means not shown) cutting off the projection light of the machine while it is still operating, the dowser shutter of another machine being simultaneously opened. Then, as the first machine comes to a stop, fire shutter 112 is also dropped automatically into place behind aperture 15.

Fire shutter 112, as shown, is a flat metal blade, which slides in vertical guides (not shown) in shutter housing 113. The upper end of the shutter is flexibly secured as by hook 115 to the combination arm and weight 116, which is rigidly connected to a shaft 117. Shaft 117 is journaled in wall 17 of the machine frame, and is linked, as indicated in Fig. 2, to a speed responsive device connected to the driving mechanism of the machine. As illustrated, a centrifugal governor 120 is mounted on shutter shaft 46, outward motion of the governor weights 121 moving grooved collar 122 to the right in Fig. 2 against spring 123. Radial arm 127 is rigidly mounted on shaft 117 and is connected by pivoted link 128 to one end of lever 125, centrally pivoted at 126 on frame wall 17. The opposite end of lever 125 carries a yoke 129 which engages grooved collar 122. As the machine reaches normal speed, lever 125 is rotated counterclockwise, turning shaft 117 clockwise, both as seen in Fig. 2. As seen in Fig. 1, shaft 117 turns counterclockwise, lifting weight 116 and withdrawing fire shutter blade 112 from the light beam. The design is such that the shutter is snapped open rapidly as the machine approaches normal speed; and is likewise closed rapidly as the machine slows below normal.

The present invention, in the preferred form illustrated, employs the front face of fire shutter 112 as a reflecting surface against which light is directed at suitable angles by special means to be described, and from which the light is then reflected through film aperture 15 to render the film visible during framing. If dowser shutter 110 were placed in front of fire shutter 112, instead of behind it as shown, it could serve the same purpose equally well; and even in the modification illustrated, dowser shutter 110 does so serve if for any reason fire shutter 112 is not closed during framing. Any shutter of similar type that is regularly interposed across optical axis 10 a short distance behind aperture 15 whenever the machine is stationary can act as a reflector for the framing light. No special construction of the movable shutter blade is necessary, a simple reflective surface, such as that illustrated, being satisfactory for the purpose. This has the advantage of economizing space and simplifying the shutter moving mechanism, which is particularly important when two or more closely parallel shutters (such as 110 and 112) must be operated by separate control means, as is normally the case.

Light is preferably directed against the front face of shutter 112 by special stationary reflecting means placed between the shutter and aperture 15 and closely adjacent the path of the projection light beam. With this arrangement, the light source itself, shown as an electric lamp 140 in a suitable housing 141, can be conveniently located well away from optical axis 10 in a position where it is readily accessible and where it does not complicate the necessarily congested arrangement of other apparatus associated with aperture 15. As illustrated, framing lamp 140 is placed directly below optical axis 15 and slightly behind film trap 20 and intermittent sprocket 50, so that light is emitted in an upward and slightly forward direction into the trap chamber 145 formed by trap frame 146 and trap face plate 147.

In the present preferred embodiment, the framing light is reflected against fire shutter 112 by reflecting shield 150, which is rigidly mounted within trap chamber 145, preferably on the rear face of plate 147 as indicated at 149. Shield 150 has a central aperture 151, adapted to transmit the projection light beam along axis 10, the edges of the aperture being everywhere as close to axis 10 as is conveniently possible without reducing the intensity of projection illumination at film aperture 15. Thus the light reflecting shield acts also as a heat shield, reducing the intensity of radiation which reaches aperture plate 16 and the portion of trap plate 147 immediately surrounding film aperture 15.

Figure 4:
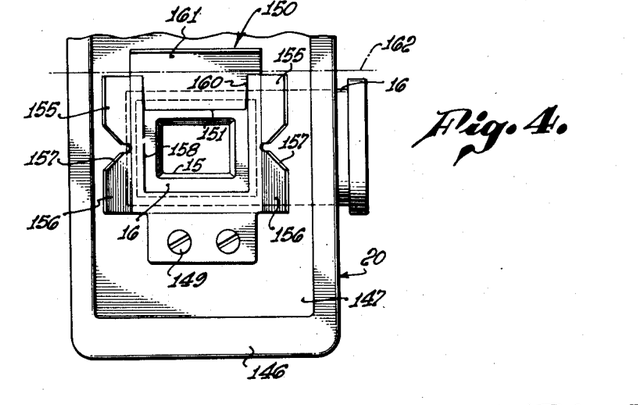
Fig. 4 is a fragmentary section, taken as indicated by line 4—4 of Fig. 1.

The lower portion 154 of reflector shield 150 is substantially flat, the main body of the plate being inclined somewhat outward from trap plate 147, bringing the entire upper portion of shield 150 into spaced relation with its surroundings and facilitating rapid cooling of the shield by air circulation through trap chamber 145. The shield sides are bent back from the general plane of shield aperture 151 to form oblique upper and lower side wings 155 and 156, separated by transverse slots 157, which allow a horizontal bend 158 in the shield proper, midway of its height, making the upper portions of the aperture side edges approximately vertical. Those aperture side edges are extended upward as vertical slits 160 above the level of the upper aperture edge (see Fig. 4). The upper part 161 of shield 150 is folded relative to the remainder of the shield about a horizontal axis 162 through the ends of slits 160. Thus upper part 161 slants upwardly back from trap plate 147 as shown in Fig. 1, extending behind the general plane of shield aperture 151 above axis 162, and ahead of that plane below axis 161.

Among the advantages of the particular form of shield 150 just described are the large reflecting surface of upper part 161, which is slanted at a suitable angle to reflect light most effectively from lamp 140 toward fire shutter 112; the side wing reflecting surfaces 155 and 156, which similarly direct light toward shutter 112 from each side of axis 10; and the relatively wide light path between the lower end of shutter housing 113 and lower side 154 of shield 150, permitting free entry of light from lamp 140 into trap chamber 145 and effective utilization of the reflecting areas just described. Light is reflected first from shield 150 and then from shutter 112, for example along the dashed line in Fig. 1, and illuminates aperture 15. An appreciable portion of such light emerges through the opening between trap 20 and open film gate 30, making the film at aperture 15 clearly visible to the operator, and enabling him to judge rapidly and reliably whether the film is properly framed. No special motions on the part of the operator are required to produce this aperture illumination, framing light 140 and reflecting shield 150 being mounted in fixed position, and the fire shutter (or other similar shutter) being automatically moved into position behind the aperture whenever the machine comes to rest.

As pointed out above, intermittent sprocket 50 must be in a rest position when the framing operation is carried out. According to the present invention, such position of the intermittent sprocket is positively indicated to the operator by means now to be described. Any readily perceptible form of signal can be used for this purpose, but it is important for reliable use of such a signal that it does not indicate rest position of the sprocket unless the intermittent mechanism is actually well within the film arresting phase of its cycle, thus giving a comfortable margin of allowable error and assuring reliable results. This is particularly true of visual indication of the sprocket position, which should be of a type which cannot be misread or misinterpreted by the operator.

According to the invention, a positive signal of suitable type is controlled by actuating means directly associated with the intermittent mechanism itself, as distinguished from the intermittent sprocket. That association with the intermittent mechanism may, for example, involve signal actuation directly by some element of the machine mechanism which moves in a definite phase relationship to the intermittent mechanism. Such an element, for example, as already indicated, is the shutter shaft 46, which carries shutters 44 and 45. That is, rotation of shutter shaft 46 with respect to the main frame of the machine has a fixed phase relationship to rotation of pin cam shaft 64 with respect to intermittent housing 75. In a machine having driving connections or intermittent mechanisms of another type, the detailed situation may be different, but the same broad principles will apply.

An important feature of the invention is the indication to the operator of the phase position of the intermittent mechanism by means of the condition of illumination of the film aperture, so that whenever the film aperture is illuminated the intermittent will automatically be in proper position for framing. This can be accomplished, for example by projecting a beam of light toward and through the aperture under control of a suitable actuating mechanism to transmit the light to the aperture only when the intermittent mechanism is within the film arresting phase. Such an arrangement provides in effect a light source (namely, the light beam) which is energized under control of the intermittent mechanism.

An illustrative manner of controlling the aperture illumination to provide a framing indicator is to connect lamp 140 (Fig. 1) in series with a source of voltage, indicated schematically at 188, and with a switch 190. An auxiliary signal, for example an electric bell, may be included in the system, as by connecting it in parallel to framing lamp 140, as indicated at S. Switch 190 is so actuated that the framing light is made to light automatically when the intermittent mechanism is within a suitable predetermined range of positions within its film arresting phase, illuminating film aperture 15. If the intermittent mechanism is not within that range of positions, and in particular, if the movement is in its film moving phase so that framing should not be attempted, switch 190 remains open and framing light 140 is off. Hence the operator cannot make the mistake of framing the film when the movement is in incorrect position, since the film aperture is then not illuminated.

It is preferable, furthermore, to provide signal actuating means which are fully operative only when the machine is stationary, or, at least, only when it is running at less than normal operating speed. An illustrative example of such means for operating a switch in the framing light circuit, such as switch 190 of Fig. 1, is shown schematically in Fig. 5. A cam 170 with flat face 172 is rigidly mounted on a shaft 171, which may, for example, be pin cam shaft 64 (Fig. 3) or shutter shaft 46 (Fig. 2). Lever 174, pivoted at 175 is urged by resilient means such as spring 176 into engagement with the periphery of the cam. Switch contact 178 is so mounted on lever 174 that it contacts fixed contact 179 only when flat cam face 172 is approximately opposite the lever. Thus the switch is closed when the cam is stationary within a certain definite range of angular positions. When shaft 171 and cam 170 are rotating rapidly, however, the cam remains within that angular range on each revolution for so short a time that the inertia of lever 174 prevents it from swinging under the influence of spring 176 through the finite angle necessary to close the switch. By properly selecting or adjusting the moment of inertia of lever 174 and the torque exerted on the lever by spring 176, the switch may be made to remain open at all cam speeds above a selected value.

Figure 5:
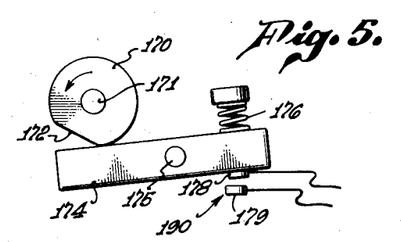
Fig. 5 is a schematic drawing illustrating mechanical switch actuating means in accordance with the invention.
Figure 6:
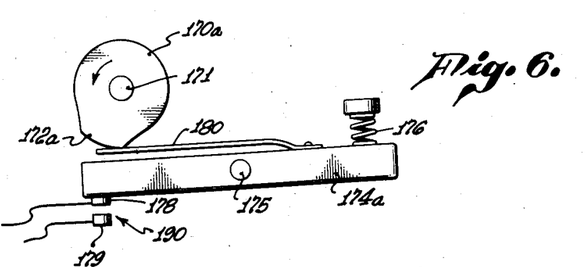
Fig. 6 is a schematic drawing illustrating an alternative form of switch actuating means.

An alternative form of switch actuating means in accordance with the invention is schematically shown in Fig. 6, corresponding parts in Figs. 5 and 6 being similarly numbered. Cam 170a does not engage lever 174a directly, but acts upon it through resilient means, typically indicated by spring 180, mounted on lever 174a and engaging the cam surface. When fully depressed by cam lobe 172a spring 180 is sufficiently stiff to overcome the force of spring 176 and rotate lever 174a to close switch contacts 178, 179. However, such rotation of lever 174a requires a finite time, because of the moment of inertia of the lever, and the switch will therefore close only after spring 180 has been held continuously depressed for a definite time, or, in practice, only when cam 170 is rotating more slowly than some definite speed. The value of that speed can be determined, as before, by proper choice of the physical constants involved.

The actuating means shown in both Figs. 5 and 6 can be characterized as time delay devices, the delay in those instances being caused primarily by the inertia of a movable part, lever 174, and acting to prevent switch closure when the cycle frequency of the control member (cam 170 or 170a) exceeds a definite value. The preferred phase relation between the switch actuating mechanisms indicated in Figs. 5 and 6 and the intermittent mechanism may be visualized by considering that shaft 171 is pin cam shaft 64 as shown in Fig. 3, and that the axis of switch actuating cam face 172, or of cam lobe 172a, is parallel to that of pin 63. Under that condition, lever 174 or 174a should be oriented with respect to the shaft as shown in Figs. 5 and 6. The switch actuation will then occur only during the film arresting phase of the intermittent cycle, and, in fact, only during a relatively short portion (determined by the length of the cam dwell) of that film arresting phase. That phase extends throughout the period that pin 63 is disengaged from star cam 61, about 270° of rotation. By making the cam dwell appreciably less than that phase angle, and timing the cam as stated above, the period of switch actuation is not only less than the period of film rest, but is spaced well within that period in the sense of both beginning and ending well within the boundaries of the film rest period.

Another illustrative form of switch actuating means is illustrated in Figs. 2 and 7. Switch 190, in the present instance preferably (as shown) of the type known commercially as a microswitch, is mounted on bracket 191, which also supports on pivot 192 a switch actuating lever 193. The inner end of lever 193 is adapted to depress actuating button 194 of the microswitch, and its outer end carries a permanent magnet 195, the weight of which normally biases lever 193 against switch closing actuation. An iron shoe 196 is rigidly mounted as by lugs 197, near the periphery of rear shutter 44 in such a position that as the shutter rotates on its shaft 46 the shoe passes closely above magnet 195, exerting an upward magnetic force of a yielding nature upon the magnet, and tending to lift it and swing lever 193 to actuate switch 190. Shoe 196 is preferably elongated circumferentially of the shutter, extending over an angular range which corresponds to appreciably less than the phase angle of the film arresting phase of intermittent mechanism 60; and extending through that portion of the periphery of shutter 44 which is adjacent magnet 195 during an intermediate portion of that phase of the movement. Whenever the machine, upon being stopped, comes to rest in a rotational position which places the intermittent mechanism within that intermediate portion of its rest phase, or whenever, after having been stopped, the machine is turned by hand (as by rotation of knob 199 on shutter shaft 46) to such a position, a part of shoe 196 will lie directly above magnet 195, and will swing lever 193 and close switch 190.

When the machine is in operation the upward magnetic force on magnet 195 acts only during a fraction of each cycle of shutter shaft 46, corresponding to the fraction of the shutter periphery over which shoe 196 extends. By suitably balancing the weight of lever 193 and magnet 195 on pivot 192, or by equivalent means, the upward force on the magnet necessary for switch actuation can be made greater than the average force resulting from the intermittent action of rotating shoe 196, and yet smaller than the continuously acting force when the shutter is at rest in film arresting position. The moment of inertia of the lever-magnet combination about pivot 192 then prevents any appreciable lever movement during the relatively brief individual periods of application of magnetic force when the machine is operating at normal speed. The inertia of the lever and magnet (and similarly the inertia of the lever 174 of Fig. 5 or of lever 174a of Fig. 6) constitutes a speed responsive means, dependent upon the speed of operation of the machine, since it causes the switch actuating mechanism to respond with differing degrees of sensitivity to the yielding actuating force. At normal machine operation switch operation is completely disabled.

If it is preferred to keep the force required for switch actuation less than the average magnetic force which acts during normal machine operation, switch actuation can be prevented during normal operation by any speed sensitive mechanism associated with the machine and connected to the switch actuating means in such a way as to render the latter inoperative at normal machine speeds, and yet permit switch actuation at low or zero speed. An example of such speed controlled means is illustrated in Fig. 2. Shutter 44 carries near its periphery fan impeller blades 200 which cooperate with shutter housing 201 to deliver a concentrated air stream through peripheral opening 202 in the housing when the machine is running at normal speed. The principal function of the fan action is to cool film aperture 15 and associated parts, by drawing air through a substantially air tight duct (not shown) between that aperture and the fan, and expelling the air at 202. By mounting a vane, indicated at 203, on the outer end of switch lever 193 in a plane transverse to the exhausted air stream, the magnetic force necessary for switch actuation is made dependent upon the speed of the machine, being unaffected when the machine is at rest and being greatly increased at normal operating speed by the downward force of the air stream on vane 203. Thus, even with a magnet arrangement which gives a very positive switch actuation with the machine at rest, the switch will remain open with the machine in operation. This arrangement is typical of a great variety of speed sensitive devices which can be used to interrupt operation of the switch actuating means when the machine is in normal operation.

Figures 8, 9:
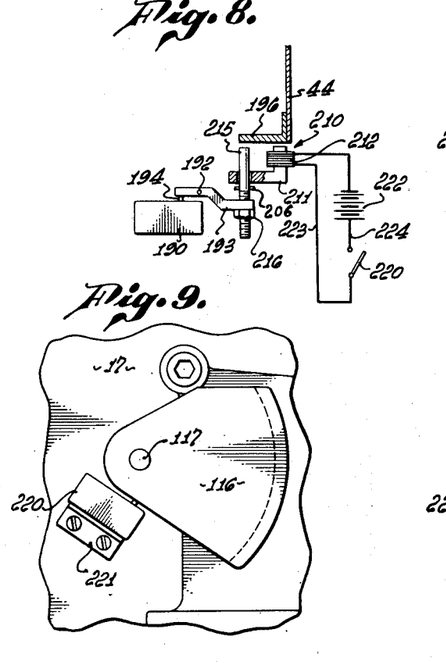
Fig. 8 is a fragmentary section, corresponding to a portion of Fig. 2 at enlarged scale, and including a schematic diagram of illustrative electrical connections.
Fig. 9 is a fragmentary elevation corresponding to a portion of Fig. 1 and showing a modification.

Fig. 8 represents a modification. As in Fig. 2, switch 190, controlling the framing and indicating light, is mounted on the machine by means of a bracket such as 191 in Fig. 2, and is actuated by counterclockwise movement of lever 193 about its pivot 192, suitably limited by a stop, indicated as a pin 206. Iron shoe 196 is mounted for rotary movement in timed relation to the film movement of the projector, and is illustratively shown, as in Figs. 2 and 7, mounted directly on shutter 44 for rotation with shutter shaft 46. An electro-magnet 210 is mounted, as on the same bracket 191, for cooperation with rotating shoe 196. Magnet 210 comprises, in the particular form illustrated, an L-shaped yoke of soft iron 211, carrying a suitable magnetizing current winding 212 on one leg. An elongated armature 215, also preferably of soft iron, is mounted on actuating lever 193 and extends freely through an aperture in the other leg of yoke 211. As shown, armature 215 is longitudinally adjustably mounted on lever 193, and may be locked in adjusted position as by lock nut 216.

Magnet 210 and armature 215 are so positioned with relation to shutter 44, as clearly indicated in Fig. 8, that shoe 196 (in certain rotational positions of the shutter) forms a bridge between them, completing a magnetic circuit through yoke 211 and armature 215. An electric current in coil 212 then produces magnetic flux in that circuit, tending to lift armature 215 toward shoe 196 and thereby actuating switch 190. Such switch actuation can occur only when the shutter shaft (and hence the intermittent film movement) is in such position as to bring shoe 196 opposite magnet 210. By suitable proportioning and mounting of the parts, that can be made to occur if, and only if, the intermittent is within some predetermined range of positions within the film arresting phase of its cycle.

The current in coil 212 and the inertia of armature 215 may be so adjusted that the armature is not appreciably moved, and does not actuate switch 190 when the magnetic force is intermittently applied, as when shutter 44 is rotating at normal speed; but does actuate switch 190 when that same magnetic force is applied steadily, as when the machine is stopped with shoe 196 in switch actuating position. However, in a preferred form of the present modification, means are provided for energizing magnet 210 only when the machine is substantially at rest. The magnetic force can then be made relatively great, insuring positive switch actuation under framing conditions, while under normal machine operation, with no current in coil 212, the switch actuating mechanism is entirely disabled.

For example, any suitable speed responsive switch may be employed to close a power circuit through coil 212 when the machine is at rest, or is substantially at rest, and to open that circuit when the machine is operating substantially at normal speed. Such a switch is indicated schematically in Fig. 8 at 220, connected via lines 223 and 224 in series with coil 212 and a suitable power source, represented typically by battery 222. Switch 220 may, for example, be a microswitch, mounted (as indicated in Fig. 9) on wall 17 of the machine frame as by a bracket 221 in such position that governor weight 116 (Fig. 1), as it falls to its fire-shutter closing position when the machine is stopped, engages the switch actuating pin, closing the switch and energizing electromagnet 210.

Figure 10:
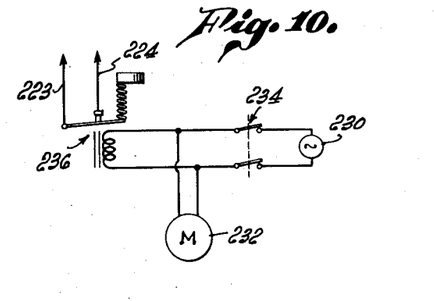
Figs. 10, 11 and 12 are schematic diagrams illustrating circuitry in accordance with the invention.

An alternative illustrative arrangement for controlling switch 220 is shown typically in Fig. 10. The main power source for projector motor 232 is represented schematically at 230, controlled in the usual manner by a motor switch 234. A normally closed relay, indicated schematically at 236, has its actuating coil connected in parallel with motor 23, and its switch contacts connected as switch 220 in Fig. 8. The circuit through coil 212 is thus open whenever the main projector motor is running since relay 236 is then actuated, and is closed, energizing magnet 210, whenever the projector motor circuit is opened to stop the motor and disactuate the relay. Such an arrangement, although not controlled directly through the speed of the machine, is actuated in accordance with the condition of operation of the machine, and is included within the scope of the term "speed responsive" as used in the present application and claims.

Figure 11:
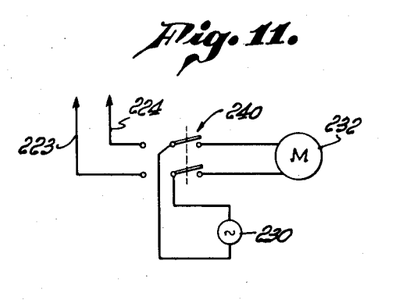
Figures 12, 18:
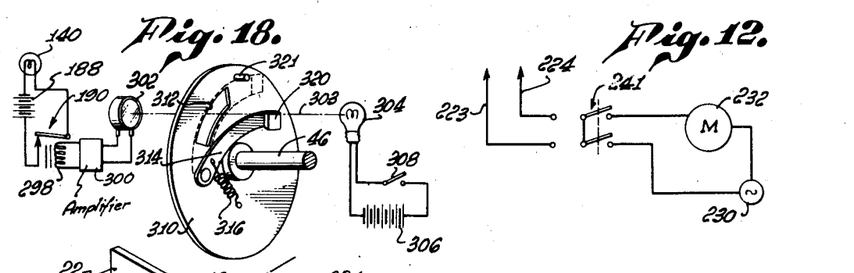
Figs. 18 and 19 are schematic perspectives illustrating further modifications of the invention.

A further illustrative modification of suitable means for controlling energization of magnet coil 210 is shown schematically in Fig. 11. Motor switch 240 is there shown as a double pole, double throw switch and is preferably of the type that snaps from one closed position to the other. In one closed position of switch 240, power source 230 is connected to projector motor 232, operating the projector. Whenever the projector is stopped, switch 240 is thrown to its other closed position, connecting power source 230 across the lines 223, 224 of Fig. 8, and directly energizing magnet 210 in preparation for the operation of framing. Current source 222 is then not required and may be omitted from the circuit of Fig. 8. Fig. 12 shows a typically alternative manner of connecting a switch 241, of the same type as 240, when it is preferred to employ the separate power source 222 for magnet energization. Operation of switch 241 to one closed position completes a circuit from main power source 230 through motor 232. In the other closed position of switch 241 that circuit is opened, stopping the motor, and a separate circuit through auxiliary power source 222 and magnet coil 212 is closed. Circuitry of the illustrative types shown in Figs. 11 and 12, like that of Fig. 10, is embraced within the term "speed responsive," as employed herein.

An alternative type of mechanism for controlling a framing light such as 140 (Fig. 1) is shown illustratively in Figs. 13–17. Switch 190 there functions as a commutator, controlling projection of light from lamp 140 in accordance with the phase position of the intermittent; and is so constructed that the commutator brushes are shifted out of operating position, as by centrifugal force, when the machine is operating at substantially normal speed.

Figures 13, 14, 15, 16, 17:
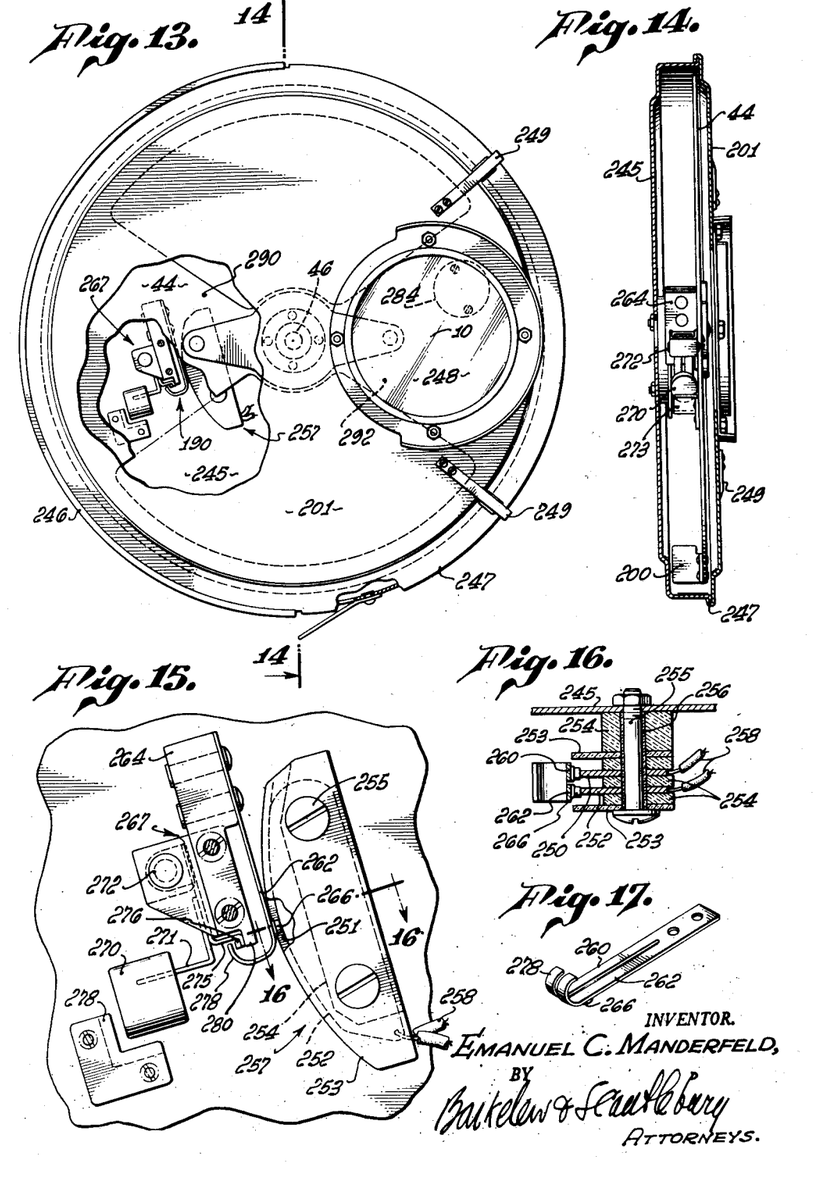
Fig. 13 is an end elevation of the machine of Figs. 1-4, taken in the same aspect as Fig. 7, and partially cut away, showing a modification.
Fig. 14 is a vertical section on line 14—14 of Fig. 13.
Fig. 15 is a fragmentary section at enlarged scale, in the same aspect as Fig. 13.
Fig. 16 is a fragmentary section on line 16—16 of Fig. 15.
Fig. 17 is a perspective of an element of Figs. 13-16.

Fig. 13 illustrates a preferred manner of mounting commutator contacts directly on rear shutter 44 of the projector. The shutter housing comprises a body portion 245 of shallow cup form that may be mounted directly on the rear face of projector case 10 (Fig. 2), and a flat circular cover portion 201. Cover 201 is removable by lateral movement (to the right as seen in Fig. 13) in its own plane. When in assembled position, its left hand edge is received by a 180 degree peripheral channel formed at 246 in the rim of housing body 245; and a similar 180 degree channel 247 (Fig. 14) formed along the right hand edge of the cover receives a radial flange on the housing rim. Spring latches, indicated at 249, releasably secure the cover in assembled position by gripping the inner edge of the housing rim. A transparent window is removably mounted on cover 201 at 248 in position to admit light to the projector along optical axis 10.

The particular form of switch 190 shown in Figs. 13–17 comprises two mutually insulated, conductive rails 250 and 252, rigidly mounted as on the inner fixed wall of shutter housing 245 or directly on the projector case, in suitable angular relation to shutter shaft 46; and two flexible contact fingers 260 and 262, electrically connected together and mounted at a suitable position on shutter blade 44. The outer rail edges 251 have a portion curved circularly and concentrically about the shutter shaft, and are respectively contacted by fingers 260 and 262 when the shutter is within a particular range of angular positions. That contact closes a circuit between the two rails, providing switch actuation.

As illustrated, rails 250 and 252 are flat metal strips, spaced from each other and from insulating guards 253 by blocks of insulating material 254. Those elements, comprising rail assembly 257, are secured together and to the case wall by two bolts 255, which are insulated from the rails as by bushings 256. Electrical connection to the rails is made in any suitable manner, as by wires 258 soldered directly to the rails.

Spring contact fingers 260 and 262 are typically formed by bifurcation of one end of a strip of flat spring metal (Fig. 17), and are preferably mounted by securing the other end of that strip to a mounting block 264 of insulating material, screwed or bolted to the shutter blade in a suitably selected location, as indicated in Figs. 13 and 15. The free ends of fingers 260 and 262 carry contact studs 266, and are so positioned that in their equilibrium position the stud faces lie radially just inside curved rail faces 251 with respect to shutter shaft 46, so that contact of studs 266 with rail edges 251 slightly distorts the springs, insuring good electrical contact.

As illustrated, contact assembly 267 includes also means for disabling the switch action whenever the machine is not substantially stationary. A centrifugal weight 270, mounted on arm 271, is pivoted at 272 for limited swinging movement along an arc that extends generally radially with respect to shutter shaft 46. A finger 275, extending from arm 271, is so formed as to engage spring fingers 260, 262 and move their contact studs 266 radially outward from shutter shaft 46 by virtue of centrifugal movement of weight 270, thereby preventing the studs from engaging rails 250, 252. As illustrated, finger 275 carries an insulating block 276, which engages the inner face of the rearwardly curved ends 278 of the two spring fingers 260, 262.

Swinging movement of weight 270 is limited radially outwardly as by a stop 278, mounted directly on shutter 44, and is limited radially inwardly as by stop lug 280 extending from mounting block 264 and directly engaging finger 275. Those limits are so arranged that when weight 270 is in its outermost position (typically when the machine is operating) finger 275 holds contact studs 266 clear of rail edges 251; and that when weight 270 is in its innermost position (typically when the machine is at rest in or near framing position) finger 275 permits studs 266 to move radially inward sufficiently to firmly engage the rails. Actual rail contact then typically lifts the ends 278 of spring fingers 260, 262 clear of finger 275 as in Fig. 15, so that the contact pressure is determined entirely by the stiffness and the relatively small inertia of spring fingers 260, 262, and is not affected by the inertia or weight of centrifugal weight 270. A light spring may be provided, urging weight 270 radially inward toward stop 280. However, in the particular arrangement illustrated, it will be noted that when the shutter is at rest in switch closing position gravity tends to swing weight 270 about pivot 272 toward the shutter shaft, making such a spring unnecessary. The weight of the entire contact assembly 267, including stop 278 (mounted on the primary shutter blade 290), is preferably counterbalanced as by a weight, indicated at 284 in Fig. 13, suitably positioned on the opposite blade 292 of shutter 44.

In the arrangement illustrated, rail assembly 257 and contact assembly 267 are so positioned as to permit switch actuation only during a relatively small portion of the entire film arresting phase of the cycle of the intermittent mechanism. That phase lasts typically about 270° of shutter rotation, while the angular extent of contact rails 250, 252 about the shutter shaft is seen to be only approximately 45°. The film moving phase of the intermittent, comprising about 90° of shutter rotation, occurs while primary shutter blade 290 is wholly or partially across the light beam at 10, the shutter blade being typically somewhat less than 90° across, as illustrated. Fig. 13 shows the switch in its actuating phase and indicates clearly that the intermittent mechanism is near the midpoint of its film arresting phase, since flicker blade 292 lies across optical axis 10. Hence it is clear from the drawings that, with the particular arrangement shown, the period of switch actuation, and hence of framing light energization, is appreciably less than, and is spaced within, the film arresting phase of the intermittent.

A further illustrative embodiment of the invention is shown schematically in Fig. 18. Framing and signal lamp 140 is connected in series with a power source 188 and a switch 190 (as in Fig. 1), the switch here comprising a relay whose magnet coil 298 is energized via an amplifier 300 under control of a light sensitive device, shown as a photoelectric cell 302. Means are provided for projecting a light beam 303 toward photocell 302, such means being represented schematically as a lamp 304 connected in series with a suitable power source 306 and a switch 308. In practice, such projecting means may include also such optical elements as lenses and mirrors, as is well understood in the art.

A shutter is arranged to intercept the light beam selectively in accordance with the phase position of the intermittent movement. Such a shutter may, for example, be an auxiliary shutter disk mounted on shutter shaft 46 of the projector, and is so shown at 310 in Fig. 18. An aperture 312 in disk 310 transmits light to photocell 302 only when the disk, and hence shaft 46, are within a particular range of angular positions, which is made to lie within the film arresting phase of the intermittent cycle. As illustrated, a shutter arm 314, pivoted at an eccentric point 316 of disk 310, is held by spring 318 in aperture exposing position (Fig. 18) when the machine is at rest; and is swung radially outward by centrifugal weight 320 against the stop 321 and into aperture covering position (dotted lines in Fig. 18) when the machine is in normal operation. Thus shutter arm 314 cuts off the light beam 303 from photocell 302 in all angular positions of disk 310 during normal operation of the projector. When the projector is stopped in the proper predetermined position for film framing, aperture 312 is uncovered and transmits light beam 303, actuating relay switch 190 and energizing framing light 140.

Centrifugal shutter 314 may be supplemented or replaced by suitable control of lamp 304. For example, switch 308 may represent a speed responsive switch, controlled in suitable manner in accordance with the condition of operation of the machine as typically described above in connection with Fig. 9, for example. Lamp 304 is then energized, and can energize relay coil 298, only when the machine is substantially at rest. Shutter disk 310 is to be considered as representative of any suitable means for controlling transmission of light beam 303 in accordance with the phase position of the intermittent movement. It may, for example be replaced by a movable mirror, in such general manner as is described below. And it will be noted that shutter 310, however constructed, may transmit light beam 303 alternatively either when framing light 140 is to be energized (as described above); or when the framing light is to be cut off. In the latter instance, for example, relay switch 190 may be of the normally closed type, closing the circuit through framing lamp 140 only when coil 298 is energized; or amplifier 300 may be so constructed as to energize relay coil 298 only when photocell 302 is dark.

Figure 19:
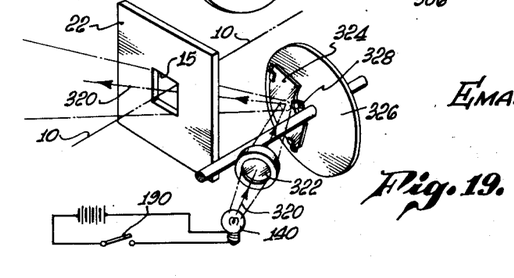

Fig. 19 illustrates schematically a typical manner in which a movable mirror may be utilized for controlling projection of light directly to the film framing aperture. A similar system may be used, for example, to control projection of light beam 303 in Fig. 18. A typical film aperture is indicated at 15 in aperture plate 22, the axis of the regular film projecting optical system being indicated at 10. Light from framing light 140 is focused into a relatively narrow beam 320 by suitable optical means, indicated as a lens 322. That light beam is reflected obliquely through film aperture 15 by a mirror 324, which is mounted for movement in accordance with the phase of the film intermittent mechanism. As illustratively shown, mirror 324, is a plane mirror mounted by means of disk 326 and clips 328 on a shaft for rotation therewith in a plane normal to the shaft axis. The shaft may be considered to represent typically the shutter shaft 46 of the projector. Mirror 324 is of sector shape, intercepting and reflecting light beam 320 only when shaft 46 is in a certain range of angular positions. The parts are so arranged that such reflection of the beam, causing it to be projected through aperture 15, occurs only when the film intermittent mechanism is in a film arresting phase of its cycle. Although mirror 324 is shown illustratively as a plane mirror, it may have other forms and may thus function to focus the light beam as well as to direct it and control its projection. In particular, the mirror may be a cylindrical or spherical mirror having its axis or center of curvature in the axis of the shaft on which it is mounted. Other optical elements may, of course, be introduced into the system to assist in delivering light to aperture 15 at an effective angle to assist the framing operation.

Particularly in the modification just described, which involves no intermittent mechanical contact of actuating parts, it is not necessary that projection of the framing light be disabled when the machine is in normal operation. However, such disabling action may be provided if desired, as by introducing in the circuit of lamp 140 a switch 190 that is controlled in accordance with the condition of operation of the machine, for example in the manner indicated in Fig. 9.

The application of the invention to projector mechanisms of other types than that here illustrated, employing, for example, other kinds of intermittent mechanisms and driving trains, will be obvious to those skilled in the art. For instance, a projector having a claw type movement may be considered. In that type of intermittent movement the claws are withdrawn from the film race during the rest phase and are projected into the race during the film moving phase of the cycle. The movement mechanism may have a pilot pin which projects into the race during the rest period to engage a sprocket perforation to register the film position, and which is withdrawn during the film moving period. In threading the film the operator has the same problems as before described; he must register the correct sprocket perforation with the pilot pin, or place the correct perforation in such a position as to be engaged by the claw. As before, it is desirable that either of these operations be performed when the intermittent mechanism is in its rest phase, so that the film can be properly located by framing it at the aperture. The characteristic features of the invention therefore apply regardless of the type of intermittent mechanism.

This application is a continuation-in-part of my prior copending application Ser. No. 779,788, filed October 14, 1947, and now abandoned.

I claim:

1. In a motion picture projection machine of the type having a film aperture, a film moving intermittent mechanism for intermittently moving a film past the aperture, said mechanism having an operating cycle that includes a film moving phase and a film arresting phase, the film arresting phase constituting a definite fraction of the entire cycle, the film moving mechanism normally alternating between said phases at a normal operating speed, and means for illuminating the exposure aperture with a relatively intense projection light beam for projecting an image of a film located at the aperture; a film framing device comprising, a shutter mounted for movement between an operative position across the projection light beam in spaced relation to the plane of the aperture and an idle position outside of that beam, framing light projecting means including a light source and means for projecting light of relatively low intensity from the light source through the aperture along a path that is effective for light transmission during presence of the shutter in its operative position, a control for the framing light projecting means having an operating control cycle that includes a framing light projecting phase and a framing light disabling phase, the said framing light projecting phase constituting a definite fraction of the control cycle, which fraction is appreciably smaller than the first said fraction, means for driving the framing light control in definite phase relation to the film moving mechanism with the framing light projecting phase of the framing light control spaced within the film arresting phase of the film moving mechanism, and means responsive to the speed of the film moving mechanism and acting to shift the shutter to its aperture covering position to shield the aperture from the projection light beam when the mechanism speed is appreciably less than normal, whereby aperture illumination with the film moving mechanism at rest can occur only if the mechanism is in condition for film framing.

2. A film framing device as defined in claim 1, and in which the said framing light projecting means includes a lamp and optical means for projecting a light beam from the lamp through the aperture when the shutter is in operative position, the said optical means including an optical element that is shiftable between beam projecting and beam disabling conditions, and in which the framing light control acts to shift the optical element between its said conditions.

3. A film framing device as defined in claim 1, and in which the framing light projecting means includes an electric lamp and electrical circuit means for energizing the lamp, there being a switch in the said circuit means, and in which there is a switch actuating connection between the switch and the said speed responsive means, the said connection acting to close the switch only when the mechanism speed is appreciably less than normal.

4. In a motion picture projection machine of the type having a film aperture, a film moving intermittent mechanism for intermittently moving a film past the aperture, said mechanism having an operating cycle that includes a film moving phase and a film arresting phase, the film arresting phase constituting a definite fraction of the entire cycle, the film moving mechanism normally alternating between said phases at a normal operating speed, and means for illuminating the exposure aperture with a relatively intense projection light beam for projecting an image of a film located at the aperture; a film framing device comprising, a shutter mounted for movement between an operative position across the projection light beam in spaced relation to the plane of the aperture and an idle position outside of that beam, framing light projecting means including a light source and means for projecting light of relatively low intensity from the light source through the aperture along a path that is effective for light transmission during presence of the shutter in its operative position, a control for the framing light projecting means having an operating control cycle that includes a framing light projecting phase and a framing light disabling phase, the said framing light projecting phase constituting a definite fraction of the control cycle, which fraction is appreciably smaller than the first said fraction, means for driving the framing light control in definite phase relation to the film moving mechanism with the framing light projecting phase of the framing light control spaced within the film arresting phase of the film moving mechanism, means responsive to the speed of the film moving mechanism and acting to shift the shutter to its operative position to shield the aperture from the projection light beam when the mechanism speed is appreciably less than normal, and means actuated in response to substantially normal operation of the film moving mechanism and acting to disable the framing light control to prevent projection of the framing light beam, whereby aperture illumination with the film moving mechanism at rest can occur only if the mechanism is in condition for film framing.

5. A film framing device as defined in claim 4, and in which the framing light projecting means includes an electric lamp and electrical circuit means for energizing the lamp, and in which the framing light control includes a switch connected in the circuit means and comprising a movable switch member and a relatively fixed switch member, the movable switch member being mounted for angular movement about an axis and for movement transversely of that angular movement, a driving connection for driving the movable switch member in its angular movement in definite phase relation to the intermittent mechanism, speed responsive means for driving the movable switch member in its transverse movement in accordance with the speed of its angular movement, one of the switch members having an angular extent about the said axis that is definitely limited and lies within the angle described by the other switch member during the film arresting phase of the operating cycle of the intermittent mechanism, and the relatively fixed switch member having, in the direction of the said transverse movement of the movable switch member, an extent that is definitely limited in such a way as to be transversely spaced from the movable switch member when the latter is rotating at normal speed, and to be transversely contiguous with the movable switch member when the latter is rotating substantially at zero speed.

6. A film framing device as defined in claim 4, and including an element having appreciable inertia and movable between an idle position in which framing light beam projection is disabled and an active position in which the framing light beam is projected, the element being yieldingly urged toward its idle position, and control means for the inertial element comprising a control member movable in a periodic cycle of movement, yielding means shiftable in response to movement of the control member between an active condition in which a yielding force is applied to the inertial element and an idle condition, the active condition of the yielding means corresponding to a definitely limited range of positions of the control member in its periodic movement, and a driving connection for driving the control member in its said movement in synchronism with the film moving mechanism in such phase relation that the control member passes through the said range of positions during the film arresting phase of the intermittent movement, the said yielding force being of such direction and magnitude as to move the inertial element to its active position when applied continuously, and being insufficient to move the inertial element to its active position when applied intermittently with the frequency of the normal cyclic operation of the film moving mechanism.

7. A film framing device as defined in claim 4, and in which the framing light projecting means includes an electric lamp and electrical circuit means for energizing the lamp, and in which the framing light control includes a switch connected in the circuit means and including a movable switch actuating element having appreciable inertia, and control means for the inertial element comprising a control member movable in a periodic cycle of movement, yielding means shiftable in response to movement of the control member between an active condition in which a yielding force is applied to the inertial element and an idle condition, the active condition of the yielding means corresponding to a definitely limited range of positions of the control member in its periodic movement, and a driving connection for driving the control member in its said movement in synchronism with the film moving mechanism in such phase relation that the control member passes through the said range of positions during the film arresting phase of the intermittent movement, the said yielding force being of such direction and magnitude as to cause switch actuation when applied continuously and being insufficient to cause switch actuation when applied intermittently with the frequency of the normal cyclic operation of the film moving mechanism.

EMANUEL C. MANDERFELD.

REFERENCES CITED

The following references are of record in the file of this patent:

UNITED STATES PATENTS

| Number | Name | Date |
| --- | --- | --- |
| 1,099,356 | Griffiths | June 9, 1914 |
| 1,845,490 | Dina | Feb. 16, 1932 |
| 2,441,185 | Brown | May 11, 1948 |

FOREIGN PATENTS

| Number | Country | Date |
| --- | --- | --- |
| 15,194 | France | Mar. 11, 1912 |
| (Addition to No. 421,659) | | |